April 23, 1957 A. M. BANK ET AL 2,789,585

CUT-OFF MECHANISM FOR ZIG ZAG WIRE

Original Filed April 5, 1951 9 Sheets-Sheet 1

INVENTORS
ALBERT M. BANK
and ALEX J. KATZ
BY
J. B. Felshin
ATTORNEY

CUT-OFF MECHANISM FOR ZIG ZAG WIRE

Original Filed April 5, 1951 9 Sheets-Sheet 2

INVENTORS
ALBERT M. BANK and
ALEX J. KATZ
BY J. B. Felshin
ATTORNEY

April 23, 1957 A. M. BANK ET AL 2,789,585

CUT-OFF MECHANISM FOR ZIG ZAG WIRE

Original Filed April 5, 1951 9 Sheets-Sheet 3

INVENTORS
ALBERT M. BANK and
ALEX J. KATZ
BY
J. B. Felshin
ATTORNEY

INVENTORS
ALBERT M. BANK and
ALEX J. KATZ
BY J. B. Felshin
ATTORNEY

CUT-OFF MECHANISM FOR ZIG ZAG WIRE

Original Filed April 5, 1951

INVENTORS
ALBERT M. BANK and
ALEX J. KATZ
BY
J. B. Felshin
ATTORNEY

CUT-OFF MECHANISM FOR ZIG ZAG WIRE

Original Filed April 5, 1951 9 Sheets-Sheet 6

INVENTORS
ALBERT M. BANK and
ALEX J. KATZ
BY
J. B. Felshin
ATTORNEY

April 23, 1957 A. M. BANK ET AL 2,789,585

CUT-OFF MECHANISM FOR ZIG ZAG WIRE

Original Filed April 5, 1951 9 Sheets-Sheet 7

INVENTORS
ALBERT M. BANK and
ALEX J. KATZ
BY J. B. Felshin
ATTORNEY

CUT-OFF MECHANISM FOR ZIG ZAG WIRE

Original Filed April 5, 1951 9 Sheets-Sheet 8

INVENTORS
ALBERT M. BANK and
ALEX J. KATZ
BY J. B. Felshin
ATTORNEY

CUT-OFF MECHANISM FOR ZIG ZAG WIRE

Original Filed April 5, 1951

9 Sheets-Sheet 9

INVENTORS
ALBERT M. BANK and
ALEX J. KATZ
BY J. B. Felshin
ATTORNEY

United States Patent Office 2,789,585

Patented Apr. 23, 1957

2,789,585

CUT-OFF MECHANISM FOR ZIG ZAG WIRE

Albert M. Bank, Jersey City, and Alex J. Katz, West Orange, N. J., assignors to Super Sagless Spring Company, Jersey City, N. J., a partnership Original application April 5, 1951, Serial No. 219,393, now Patent No. 2,676,621, dated April 27, 1954. Divided and this application March 8, 1954, Serial No. 414,562

11 Claims. (Cl. 140—71)

This application is a division of our co-pending application, Serial No. 219,393, filed April 5, 1951, for Wire Forming Machine, now Patent No. 2,676,621 of April 27, 1954.

This invention relates to wire forming machines. It is particularly directed to a machine for shaping straight wire into zig-zag shape.

An object of this invention is to provide a highly improved machine for shaping wire fed thereto, into zig-zag shape, curving or arching the zig-zag shaped wire longitudinally, and cutting off predetermined indexed lengths of said wire automatically and at a substantially high rate of speed.

Another object of this invention is to provide in a machine of the character described, highly improved means to stop the operation of the machine, should the passage of the formed wire coming from the wire-forming mechanism to the cut-off mechanism be held up at the cut-off mechanism beyond a predetermined extent.

Still another object of this invention is to provide in a machine of the character described highly improved means to insure cut-off of predetermined lengths of zig-zag shaped wire at identical points relative to the bends of the wire.

Yet another object of this invention is to provide in a machine of the character described, continuously operating wire-forming mechanism, means to feed the formed wire to the cut-off mechanism and means to momentarily halt the movement of the formed wire at the cut-off point during each cut-off operation.

Still another object of this invention is to provide in a machine of the character described, means controlled by the wire-forming mechanism to feed the formed zig-zag wire away from the wire-forming mechanism, and means controlled by the wire-forming mechanism to halt the feeding of said zig-zag shaped wire away from said mechanism and to cut off the wire while its feeding movement is halted.

Still a further object of this invention is to provide a strong, rugged and durable machine of the character described, which shall be relatively inexpensive to manufacture, smooth and positive in operation, which shall produce a uniform product, and which shall yet be practical and efficient to a high degree in use.

Other objects of this invention will in part be obvious and in part hereinafter pointed out.

The invention, accordingly, consists in the features of construction, combinations of elements, and arrangement of parts, which will be exemplified in the construction hereinafter described, and of which the scope of invention will be indicated in the following claims.

In the accompanying drawings in which are shown various illustrative embodiments of this invention, Fig. 1 is a side elevational view of a machine embodying the invention;

Fig. 28 is a cross-sectional view taken on line 28—28 of Fig. 27;

Figures 1, 39:
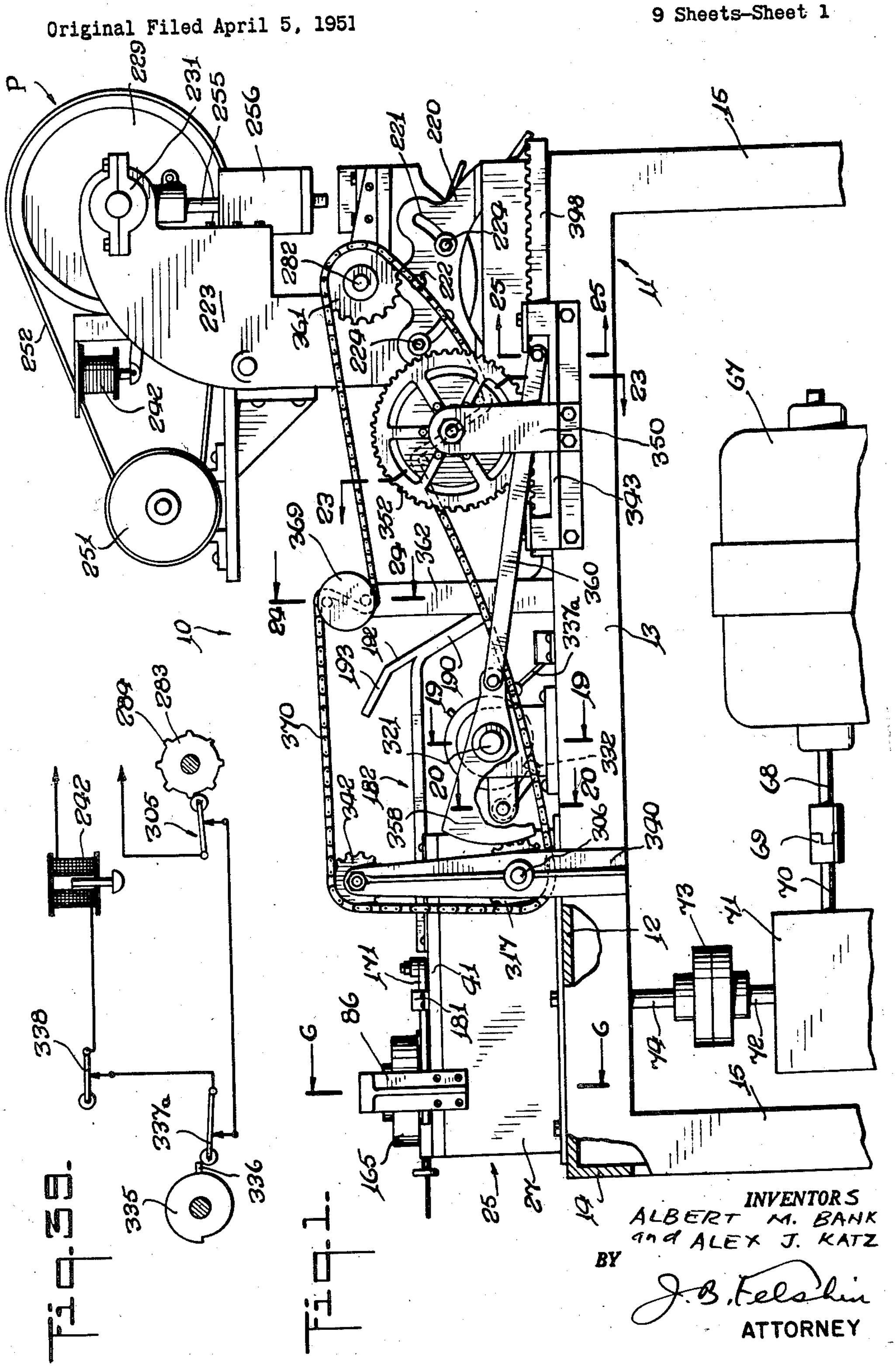
Fig. 39 is a wiring diagram of the electrical system for controlling the cut-off mechanism, insuring indexed cut-off, and for stopping the operation of the machine if the wire stops feeding away from the wire-forming mechanism, for insuring safe operation of the machine.

Referring now in detail to the drawing, and particularly to Fig. 1, 10 designates a machine embodying the invention. The same comprises a frame or base 11. Said base has a top wall 12 provided with downwardly-extending longitudinal side flanges 13 and end flanges 14. The top of the base is supported on legs 15.

Figures 6, 9, 10, 11:
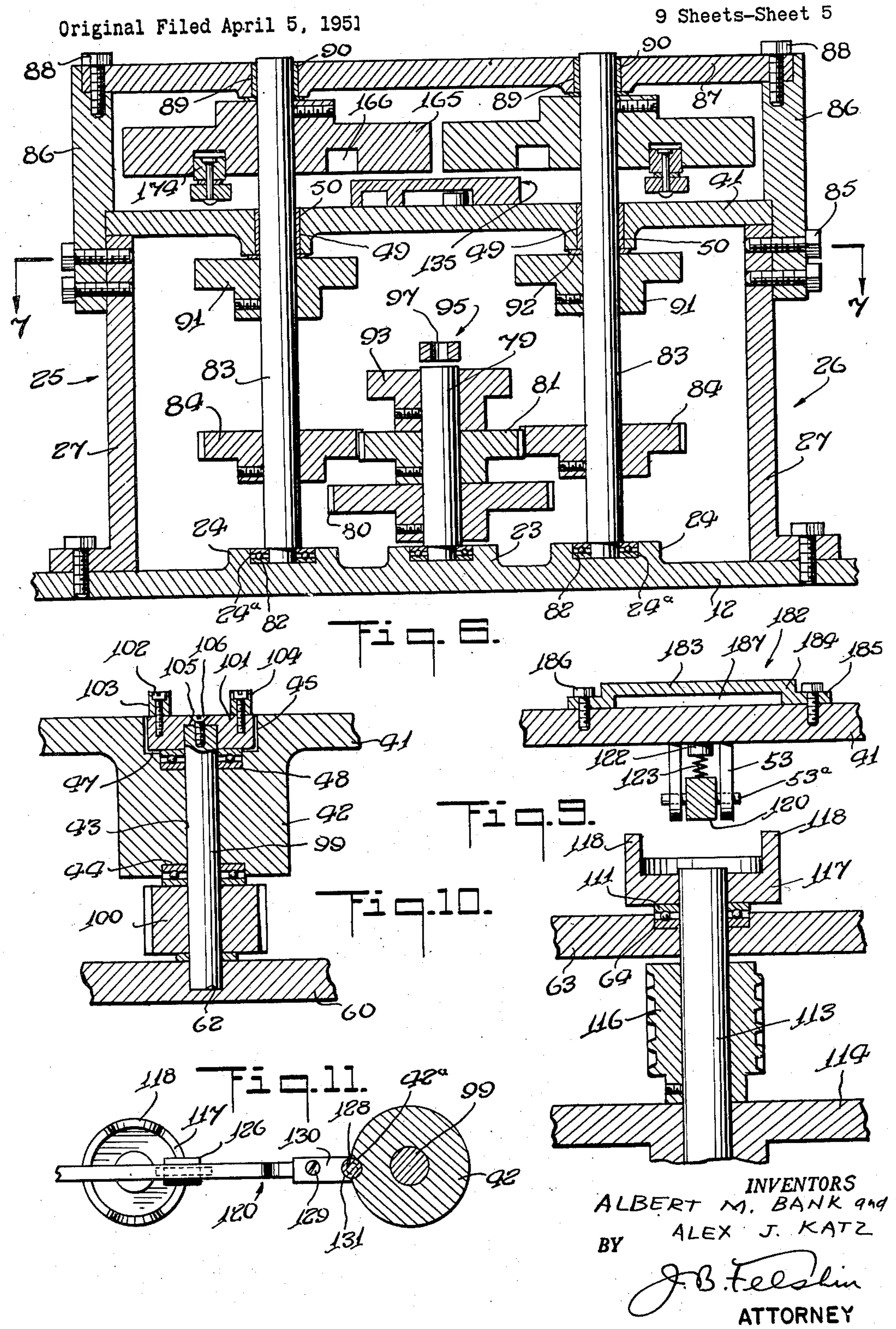
Fig. 6 is a cross-sectional view taken on line 6—6 of Fig. 1.
Fig. 9 is a cross-sectional view taken on line 9—9 of Fig. 8.
Fig. 10 is a cross-sectional view taken on line 10—10 of Fig. 8.
Fig. 11 is a cross-sectional view taken on line 11—11 of Fig. 8.
Figures 7, 8:
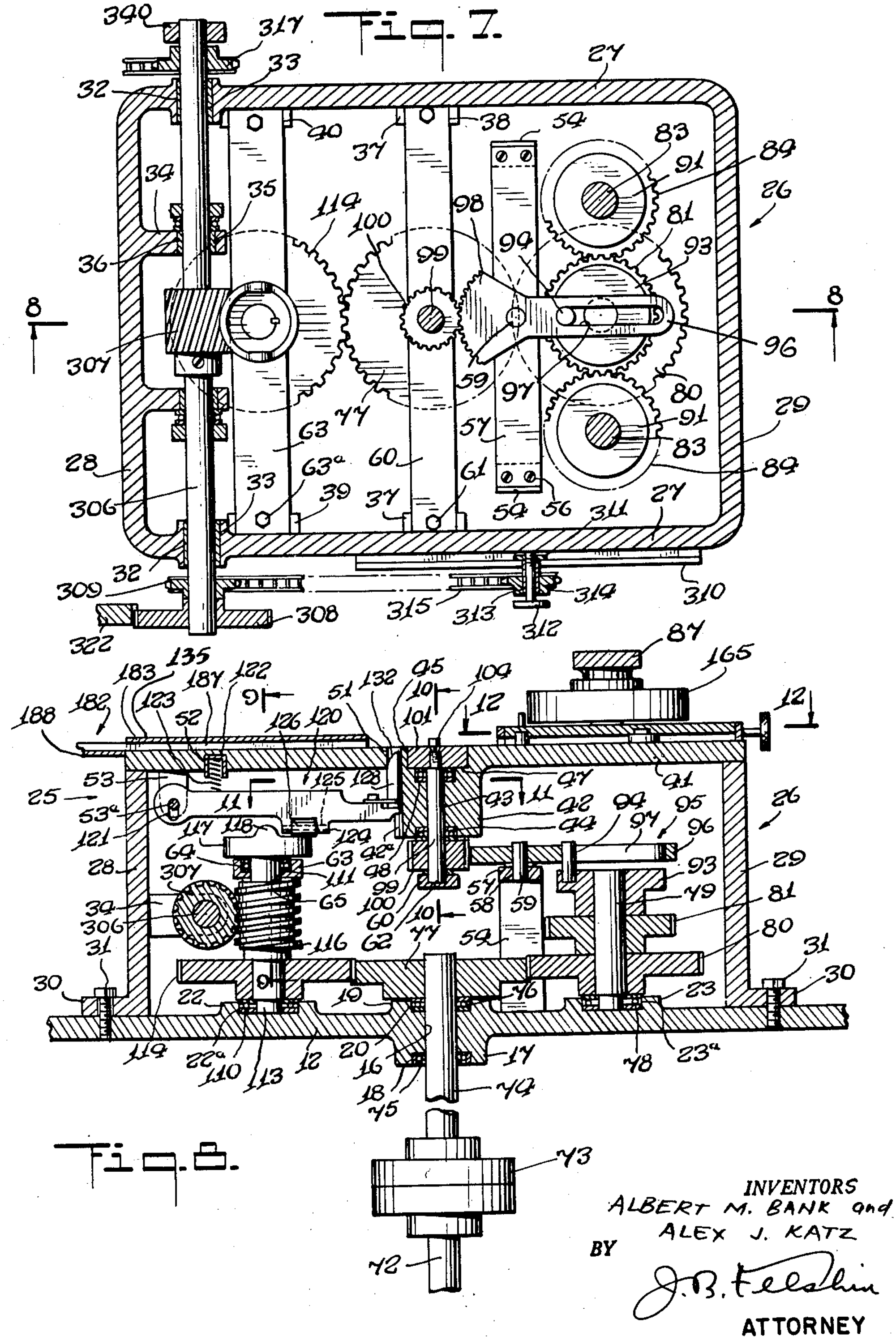
Fig. 7 is a cross-sectional view taken on line 7—7 of Fig. 6.
Fig. 8 is a cross-sectional view taken on line 8—8 of Fig. 7.

Said top wall 12 is formed with a through opening 16 (Fig. 8) on the longitudinal axis thereof. Surrounding the opening 16 is a downwardly-extending hub 17 formed at its underside with a countersunk bearing socket 18 and with an upwardly-extending hub 19 formed at its upper side with a countersunk bearing socket 20. Said top wall 12 is furthermore formed on its longitudinal axis with a pair of spaced upwardly-extending hubs 22 and 23 formed with countersunk bearing sockets 22*a* and 23*a*, respectively. The hubs 22 and 23 are disposed on opposite sides of the hub 19, as shown in Fig. 8 of the drawing. On opposite sides of the hub 23, said top wall 12 is formed with a pair of upwardly-extending hubs 24 (Fig. 6). The hubs 24 are formed with countersunk bearing sockets 24*a*. A line interconnecting the axes of hubs 24 and 24 is at right angles to a line interconnecting the axes of hubs 23, 19 and 22.

Mounted on top of the top wall 12 of the base and enclosing the hubs 19, 22, 23 and 24 is a box 25 (Figs. 6–8). Said box 25 comprises a case portion 26 having parallel longitudinal vertical side walls 27 (Fig. 6), and transverse parallel vertical end walls 28 and 29. Said walls 27, 28 and 29 are formed at their lower ends with outwardly-extending flanges 30, screwed to the top wall 12 as by screws 31. Side walls 27 are formed with horizontally-aligned through openings 32 in which are fixed bushings 33 (Fig. 7). Extending from the vertical wall 28 are a pair of parallel lugs 34 formed with through openings 35 receiving aligned bushings 36. Extending from the side walls 27 are a pair of horizontally-aligned inwardly-extending shelves 37 formed with grooves 38 in their upper surfaces. Also extending inwardly from the side walls 27 are a pair of horizontally-aligned shelves 39 formed with grooves 40 in their upper surfaces.

Mounted on the top of the case 26 is a top wall or table 41 contacting the upper edges of the walls 27, 28 and 29, and fixed thereto with any suitable fastening means. Said top wall 41 is formed with a central downwardly-extending hub 42 formed with a through opening 43. The lower end of the hub 42 is formed with a countersunk bearing socket 44, communicating with the through opening 43. The opening 43 is coaxial with the through opening 16. The top surface of top wall 41 is formed with a countersunk annular socket or opening 45 having a bottom wall 47. The bottom wall 47 is formed with a countersunk bearing socket 48. The sockets 45 and 48 are concentric with and communicate with the through opening 43.

Said top wall or table 41 is formed with a pair of parallel vertical through openings 49 vertically coaxial with the bearing sockets 24*a* and received within each opening 49 is a bushing 50 (Fig. 6). Said top wall 41 is furthermore formed with a vertical through opening 51 adjacent the socket 45. The opening 51 is disposed between said socket 45 and the wall 28. The axes for the socket 45 and the opening 51 are in a common longitudinal vertical plane.

Said top wall 41 is furthermore formed adjacent the wall 28, at its underside, with a socket 52 for the purpose hereinafter appearing. Extending downwardly from the underside of the top wall 41 are a pair of parallel brackets 53 carrying a transverse horizontal pivot pin 53*a* (Figs. 8 and 9). The brackets 53 are located between the socket 52 and wall 28 of the box.

Fixed to the top wall 12 of the base which forms the bottom of the box 25 and extending upwardly therefrom are a pair of rods 54 spaced inwardly from walls 27 and disposed between the hubs 23, 24 and the central hub 19. Attached to the uper ends of the rods 54, as by screws 56 is a horizontal transverse bar 57 formed with a central opening 58 in which is fixed the lower end of a pin 59 extending upwardly therefrom for the purpose hereinafter appearing.

Supported on and between the shelves 37 is a transverse horizontal bar 60. The ends of the bar 60 are received in the grooves 38 and they are attached to the shelves by means of screws or bolts 61. The transverse bar 60 is formed in its upper surface with a central socket 62, coaxially aligned with the through opening 43. Supported on and between the shelves 39 is a horizontal transverse bar 63. The ends of the bar are received in the grooves 40 of the shelves 39 and are attached to said shelves by means of screws or bolts 63*a*. Said bar 63 is formed with a central downwardly recessed countersunk socket 64 and with an axial through opening 65 communicating with and coaxial with said socket 64. The opening 65 is coaxial with the socket 22*a* in the hub 22.

Mounted beneath the base 11 on any suitable bracket is an electric motor 67 (Fig. 1) provided with an armature shaft 68 connected by coupling 69 to a shaft 70 leading to reduction gearing box 71. Extending from the gearing box 71 is a vertical shaft 72 connected by coupling 73 to a vertical shaft 74, passing through the opening 16 in the bottom wall 12. Within the bearing socket 18 is a ball bearing 75 for centering the shaft 74 (Fig. 8). Within the socket 20 is a thrust bearing 76. The upper end of the shaft 74 projects into the box 25, and fixed to its upper end, is a gear 77 resting on the thrust bearing 76. Within the socket 23*a* is a thrust bearing 78 in which is journaled the lower end of a vertical shaft 79. On the lower end of the shaft 79 is a gear 80 meshing with the gear 77. Gear 80 is keyed to the shaft 79 in any suitable manner. Also keyed to said shaft 79 and disposed on top of the gear 80 is a gear 81.

Referring now to Fig. 6, there is mounted within the sockets 24*a*, thrust bearings 82. Journaled in and supported on the bearings 82 are the lower ends of a pair of parallel vertical shafts 83 passing upwardly through the bushings 50 in the top wall 41. Fixed to the shafts 83 are gears 84 which mesh with said gear 81. Said shafts 83 project above the top wall 41.

Attached to the upper ends of side walls 27, as by screws 85, are vertical struts 86 supporting a transverse horizontal bar 87 (Figs. 6, 8) attached to the upper ends thereof as by screws 88. The horizontal transverse bar 87 is formed with vertical through openings 89 coaxial with the openings 49. Within each opening 89 is a bushing 90.

The upper ends of the shafts 83 are received within the bushings 90. Fixed to the shafts 83 are collars 91. Interposed between said collars and the hubs surrounding the through openings 50 are anti-friction washers or gaskets 92.

Fixed to the upper end of shaft 79 is a collar 93 (Figs. 7 and 8). Fixed to the collar 93 and extending upwardly therefrom is an eccentric pin 94. Pivoted to the pin 59 on the bar 57 is a lever 95 formed with an intermediate vertical opening to receive the upper end of said pin. At one end of the lever 95 is an arm 96 formed with a longitudinal slot 97, through which the eccentric pin 94 passes. At the opposite end of the lever is a segmental gear 98. Passing through the through opening 43 in the hub 42 (Fig. 8) is a vertical stud shaft 99 journaled in suitable bearings received in the sockets 44 and 48. The lower end of the shaft 99 is received within the socket 62 of the transverse bar 60.

Mounted on the shaft 99 and disposed between the hub 42 and the bar 60, is a pinion 100 meshing with the segmental gear 98. Fixed to the upper end of the shaft 99 is a circular disc, rotor or turret 101. The turret 101 is received within the countersunk opening 45. The top surface of the turret 101 is flush with the top surface of the table or top wall 41. Fixed to the upper side of the turret 101, as by screws 102, are a pair of diametrically opposed pins 103, 104 which project upwardly from the disc above the top surface of the top wall 41. The pins 103, 104 are equidistant from the center of the disc 101. The disc 101 may be counter-sunk at its underside as at 105, to receive the upper end of the shaft 99, and may be attached to said disc by a screw 106.

It will now be understood that when the electric motor 67 (Fig. 1) is energized, drive shaft 74 will rotate, to rotate the shaft 79 in one direction, causing the lever 95 to oscillate due to the action of the eccentric pin 94 within the slot 97. Oscillation of the lever 95 will cause oscillation of the pinion 100, and hence shaft 99 and rotor 101, in opposite directions. The gearing is so arranged so as to cause the rotor 101 to oscillate in opposite direction through an angle of 360° in each direction.

Within the socket 22*a* (Fig. 8) is a thrust bearing 110. Within the socket 64 is a thrust bearing 111. Journaled within said bearings is a vertical shaft 113. Mounted on the lower end of said shaft is a gear 114 meshing with the gear 77. On said shaft 113 is a worm 116. The shaft 113 extends above the bar 63. Fixed at the upper end thereof is an annular cam disc 117 provided with a pair of upwardly extending cam bumps 118.

It will now be understood that rotation of the drive shaft 74 will cause the worm 116 to rotate through the intermeshing gears 77 and 114.

Pivoted to the pivot pin 53*a* on the brackets 53 is a lever 120 (Figs. 8 and 11). The lever 120 is formed at its rear end with a vertical slot 121 through which the pivot pin 53*a* passes. Interposed between the lever 120 and a cup-shaped member 122 fixed within the socket 52 is a coil compression spring 123 which normally urges the lever 120 downwardly. The lever 120 is provided with a pair of downwardly-extending apertured ears 124 carrying a transverse pin 125 on which is mounted a roller 126 pressed downwardly against the cam member 117. As the shaft 113 rotates, the bumps 118 will raise the lever twice for every complete revolution of the shaft 113. When the bumps 118 pass the roller 126, the springs 123 will lower the lever.

The hub 42 is formed with a vertical slot 42*a* registering with the opening 51. Slidably mounted in said slot and adapted to pass upwardly through the opening 51, is a stop member, pin or finger 128, the lower end of which rests on the forward end of the lever 120. Fixed to the lever as by screw 129 is a spring leaf 130 formed with a semi-circular notch 131 at its forward end engaging a groove in the circular finger or rod 128. The front side of the upper end of the pin or rod 128 is rounded or beveled as at 132.

It will now be understood that as the motor operates and shaft 113 rotates, lever 120 will be oscillated to reciprocate the pin 128 above the top surface of table 41. If the pin 128 is held from rising for any reason, lever 120 will rotate, when engaged by bumps 118 about its outer end as a fulcrum. Such movement is permitted because of slot 121 providing a safety feature if pin 128 gets stuck or is held back for any reason.

The gears 114 and 80 are similar so that one revolution of the gear 80 is equivalent to one revolution of the gear 114. Therefore, one revolution of the shaft 113 will be accompanied by one revolution of the shaft 79. During one revolution of the shaft 79, rotor 101 will be oscillated substantially 360° in one direction and 360° in an opposite direction. During such operation, the finger 128 will be raised and lowered twice. Thus, the pin 128 will be raised and lowered once as the rotor 101 rotates through one direction, and once during rotation of the rotor in an opposite direction.

While the roller 126 is in contact with the portion of the disc 117 between the cams or bumps 118, the pin or finger 128 stays down so that its upper end is not above the upper surface of the top wall 41.

Referring to Figs. 12 to 14, and 34, means is provided to feed the wire W to be formed into zig-zag shape on table 41, and to, and over the oscillating turret 101, and to straighten the wire as it is being so fed. To this end, there is attached to the top surface of top wall 41, a guide member 135. Said guide member 135 is in the form of a flat plate formed at its undersurface with a longitudinal groove 136 extending to its rear end. Said flat member 135 is also formed with a groove 137 at its underside parallel to groove 136 and extending from the rear end of said member about one-half way through said member. Said member 135 is also formed adjacent its forward end with aligned transverse grooves 138 communicating with the front end of the groove 136. At the forward end of member 135 is an opening or groove 139 communicating with the forward end of the groove 136. The grooves 136 and 137 are interconnected by a transverse groove 140. Attached to the rear end of member 135 as by screws 141 is a transverse plate 142 formed with a central opening 143 communicating with the groove 136. Said plate is also formed with a screw threaded through opening 144 communicating with the groove 137. Attached to the front end of member 135 is a plate 145 screwed thereto as by screws 146. Plate 145 is formed with an opening 147 which registers with the opening 139. Supported by the portion of member 135 above the groove 136 are a pair of spaced longitudinally aligned pins 148, each carrying a roller 149 disposed within said groove. The upper ends of said pins are fixed in openings in said portion of said member. Slidably mounted through the transverse opening 140 is a bar 150. At one end of the bar 150 is carried a pin 151 on which is rotatably mounted a roller 152, disposed within the groove 136. At the opposite end of the bar 150 is a downward projection 153 located within groove 137. Slidably mounted in the groove 137 is a cam bar 154 having at its forward end a beveled cam surface 155 adapted to engage said projection 153. Screwed through the threaded opening 144 is a hand screw 156, the forward end of which is rotatably but non-slidably connected to said bar. On turning the screw 156, the cam bar 154 is pushed forwardly, thereby moving the bar 150 to the left, looking at Fig. 12.

It will be noted that the roller 152 is located on one side of the wire W while the rollers 149 are located on the opposite side of said wire. Furthermore, the roller 152 is located about midway of the rollers 149. By properly adjusting the position of the roller 152, the wire W passing through opening 143, groove 136 and openings 139, 147, may be straightened.

Referring to Figs. 12, 13, 14 and 34 to 38, means is provided, furthermore, to tend to urge the wire W laterally toward its mid-position in alignment with the axis of turret 101, when it emerges from the openings 139, 147. To this end there is slidably mounted in the transverse grooves 138, a pair of sliders 160. Attached to each slider and extending upwardly therefrom is a pin 161. The pins 161 pass through longitudinal slots 162 formed in the top of the member 135, and communicate with the grooves 138. The pins 161 are interconnected by a coil tension spring 163 disposed above member 135. As the wire W is moved to the left or right during the formation of the zig-zag shape, in the manner explained hereinafter, the spring 163 pulling inwardly on the sliders 160, tends to bring the wire W always back to a central position.

It will be noted that movement of the pins 161 is limited by the inner ends of the slots 162. Thus, looking at Fig. 13, if the wire W is moved to the left from the position shown, the right slider will not move, but the left slider will move to the left to tension the spring 163 and such tension tends to move the wire W back to its normal position. If the wire moves to the right it is also pulled toward a central position by spring 163.

Figures 34, 35, 36, 37, 38:
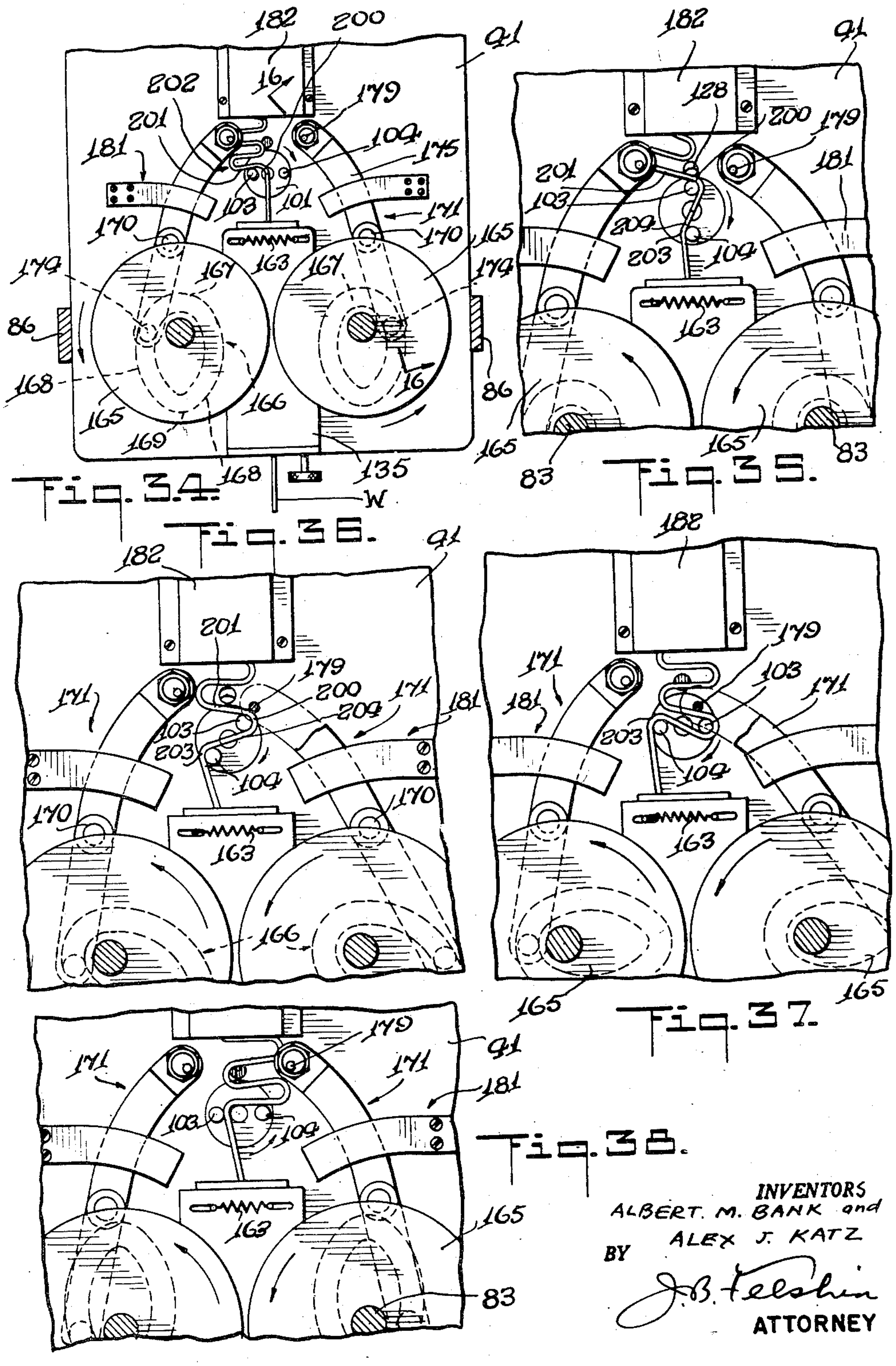
Fig. 34 is a top plan view illustrating one step in the wire-forming operation.
Fig. 35 is a view similar to Fig. 34, but showing the forming turret advanced 90° from the position of Fig. 34.
Fig. 36 is a top plan view similar to Fig. 35, and showing the turret advanced 45° from the position shown in Fig. 35.
Fig. 37 is a view similar to Fig. 36, and showing the turret advanced another 45° in the same direction.
Fig. 38 is a view similar to Fig. 37, but showing the turret rotated back 180° from the position shown in Fig. 37.

As shown in Fig. 34, the wire W emerging from the openings 139, 147 passes over the face of turret 101. Means is provided to shape the wire around the turret pins 103, 104. To this end there is fixed to the portion of each shaft 83 (Fig. 6), between the top wall 41 and top cross bar 87, a box cam 165. These box cams are similar and symmetrically disposed with respect to each other. Each of the box cams 165 is formed at its underside with a cam groove 166. Each cam groove 166 has a semi-circular portion 167 of relatively small radius and portions 168 increasing in radius towards an apex or high point 169.

Figures 12, 13, 14, 15, 16, 17, 18:
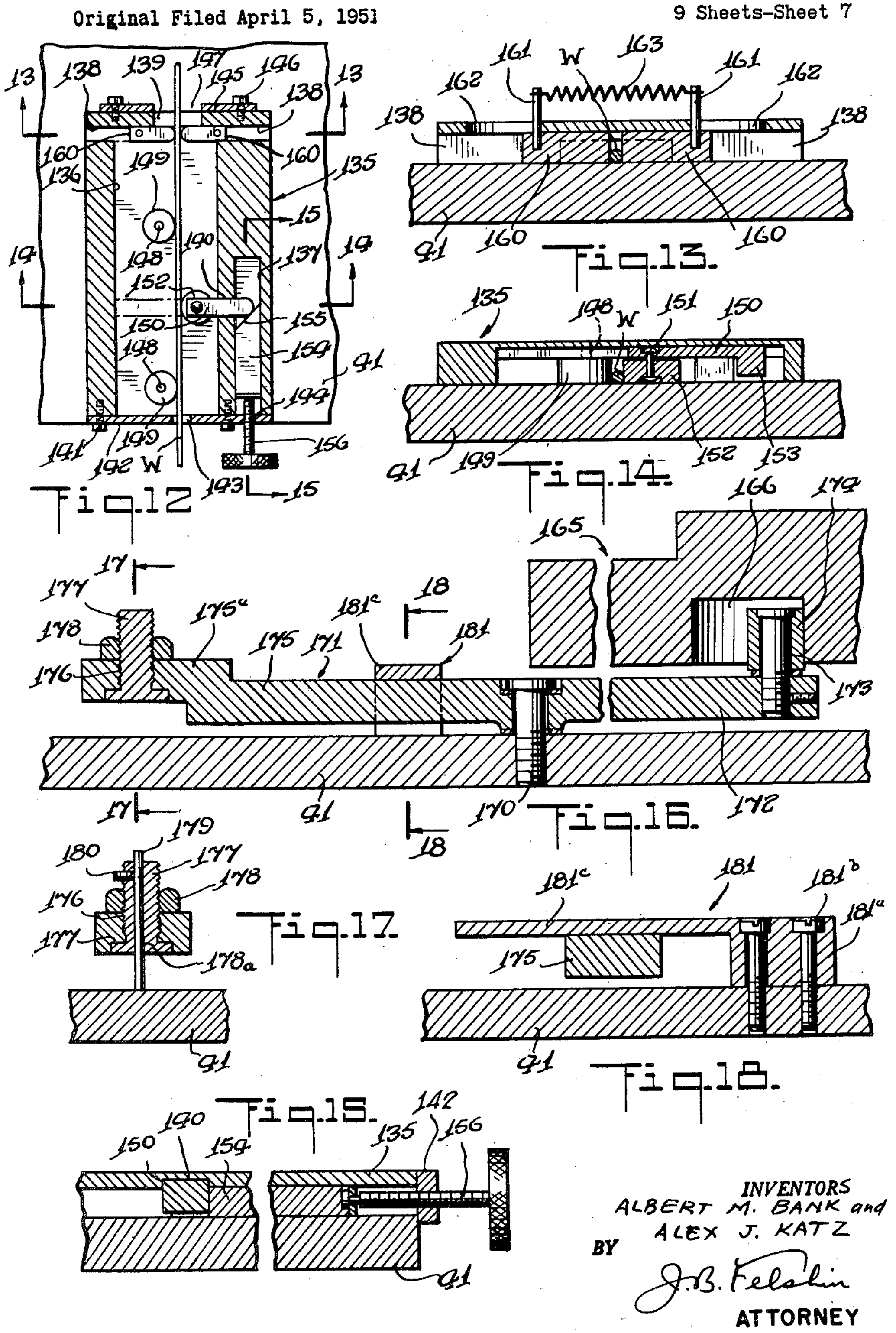
Fig. 12 is a cross-sectional view taken on line 12—12 of Fig. 8.
Fig. 13 is a cross-sectional view taken on line 13—13 of Fig. 12.
Fig. 14 is a cross-sectional view taken on line 14—14 of Fig. 12.
Fig. 15 is a cross-sectional view taken on line 15—15 of Fig. 12.
Fig. 16 is a cross-sectional view taken on line 16—16 of Fig. 34.
Fig. 17 is a cross-sectional view taken on line 17—17 of Fig. 16.
Fig. 18 is a cross-sectional view taken on line 18—18 of Fig. 16.

Screwed to the top wall 41 on opposite sides of member 135 and adjacent the forward end thereof, is a headed pivot pin 170 (Figs. 16 and 34) projecting above said top wall. Pivoted to each pivot pin 170 and disposed above the top wall 41 is a wire-bending lever 171. The two levers 171 are similar and symmetrically disposed with respect to one another. Each lever comprises a rearwardly-extending arm 172 to the rear end of which is screwed a headed pin 173 projecting upwardly into one of the cam grooves 166. On each pin 173 is a roller or follower 174 disposed within the cam groove 166. Each lever 171 further comprises a forwardly and inwardly curved arm 175 formed at its inner end with a countersunk screw-threaded opening 176. Screwed into said opening is a screw 177 having a head at its underside received in the countersunk socket 176 at the underside of the arm. Screwed to the screw 177 is a nut 178 contacting the top of the arm. The screw 177 is formed with a vertical through eccentric opening 178a (Fig. 17). Extending through said opening 178a is a wire engaging pin 179 projecting downwardly from the arm and substantially contacting the top surface of the top wall 41. The pin 179 may be held in position by a set screw 180.

It will be noted that the forward end 175a of the arm 175 is offset upwardly as shown in Fig. 16 of the drawing.

Attached to the top surface of the top wall 41 are a pair of similar symmetrically disposed lever guide arms 181 (Figs. 18 and 36) overlying the arms 175 to prevent said arms from moving upwardly. It will be noted that each guide 181 comprises an outer block 181a contacting the top surface of top wall 41 formed with countersunk through openings to receive screws 181b for attaching said guide to the top wall. Extending from each block 181a is a bar 181c spaced above and parallel to the top wall 41 and disposed above the upper surface of the arm 175, as shown in Fig. 18 of the drawing.

Attached to the upper surface of the top wall or table 41 and extending longitudinally thereof and disposed forwardly of the turret 101 and opening 51 is a guide 182 to receive the zig-zag shaped wire formed in the manner hereinafter explained. Said guide 182 comprises a top wall 183 spaced above the top wall 41. Extending downwardly from the sides of the top wall 183 are side walls 184 from which extend outwardly flanges 185 formed with openings to receive screws 186 for attaching said guide to the top wall 41. The guide 182 forms with the top wall 41 a shallow passage 187 into which the formed zig-zag wire passes. The guide 182 extends horizontally forwardly of the box 25 as shown in Figs. 1, 2 and 3 of the drawing.

Said top wall 183 extends substantially only to the forward end of the box 25. The rear end of the passage 187 is open so that the formed wire may enter said passage. Forwardly of the box 25, the guide 182 comprises a bottom wall 188 interconnecting the lower ends of the side walls 184 to form an extension of the passage 187, which passage, however, is open at the top, forwardly of the box 25.

Figure 2:
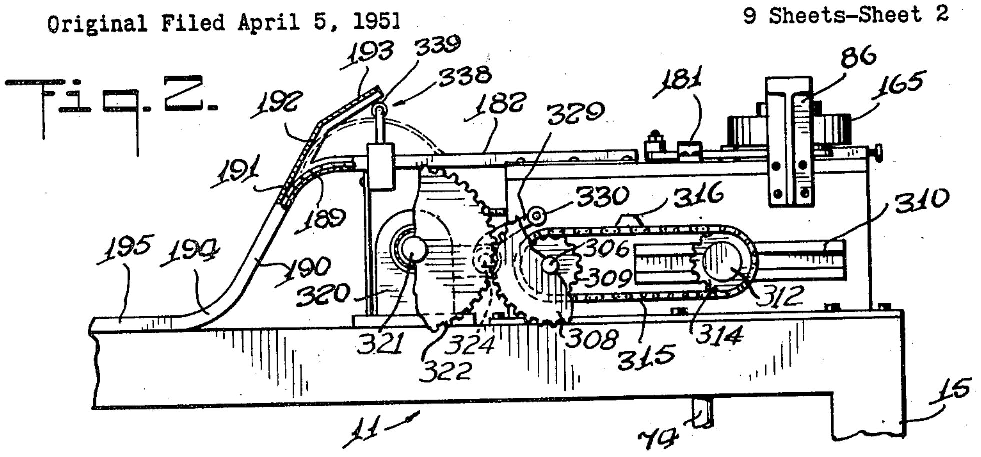
Fig. 2 is a side elevational view of part of the machine showing a side opposite to the side shown in Fig. 1.
Figures 3, 21, 22:
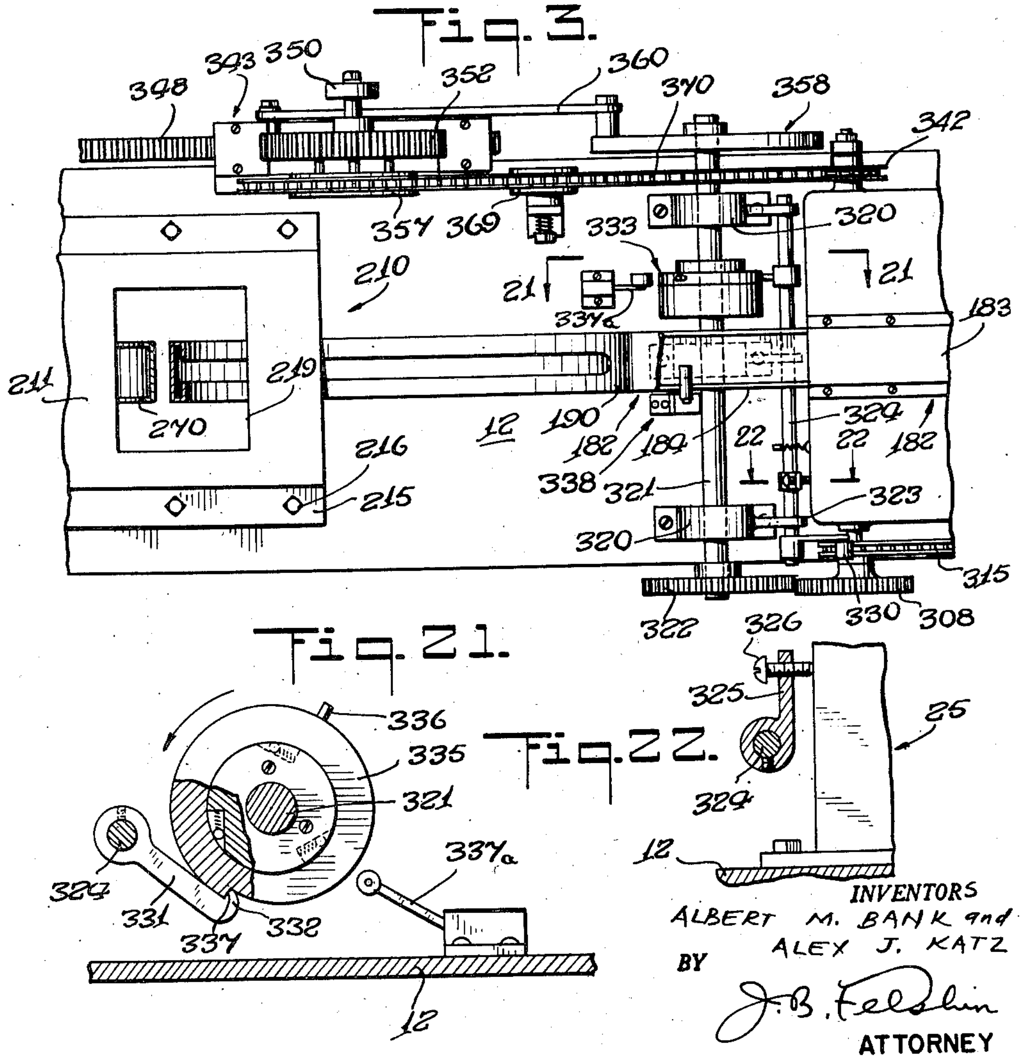
Fig. 3 is a partial top plan view of the machine.
Fig. 21 is a cross-sectional view taken on line 21—21 of Fig. 3.
Fig. 22 is a cross-sectional view taken on line 22—22 of Fig. 3.
Figures 4, 26, 27, 29, 30:
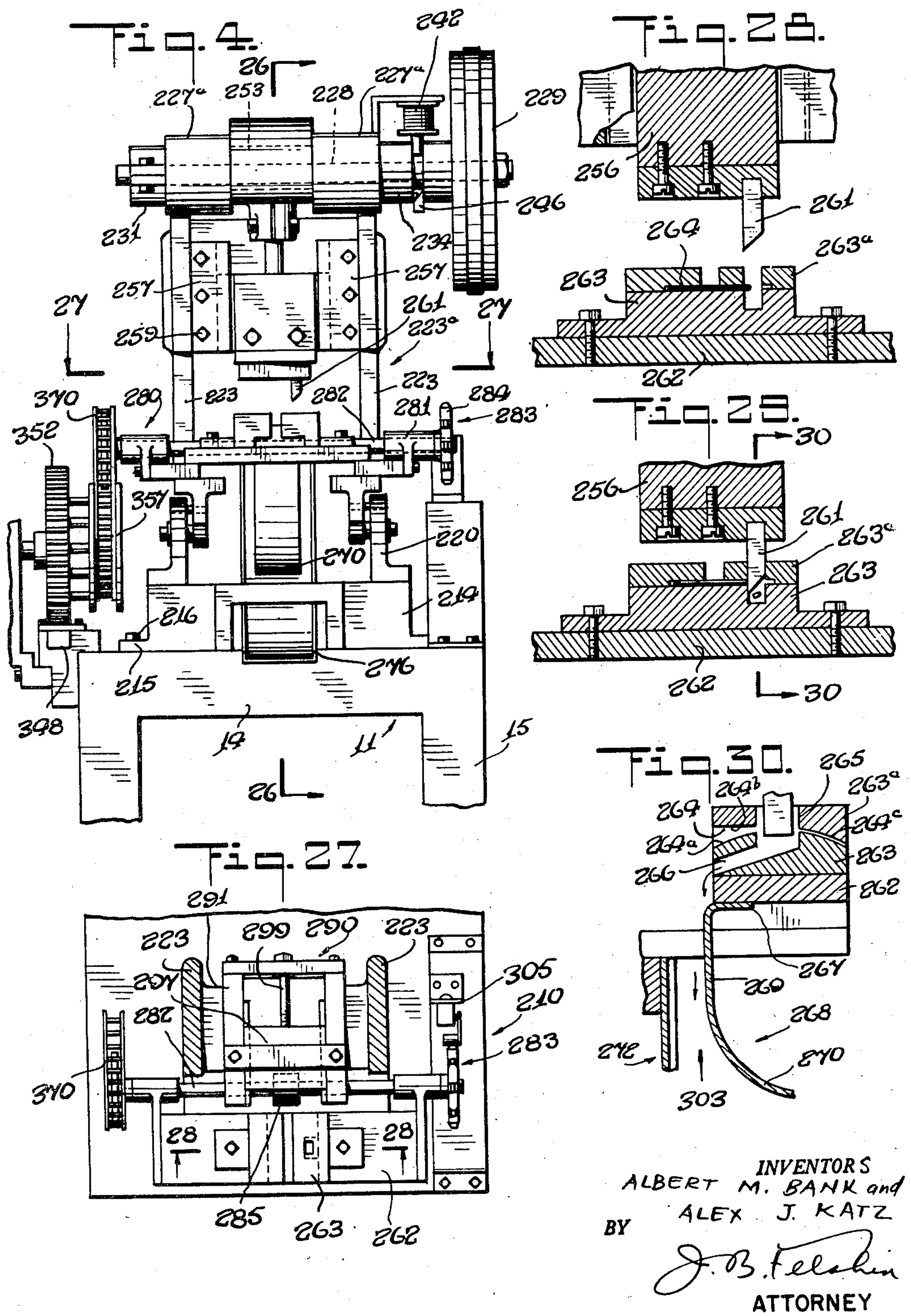
Fig. 4 is an end elevational view of the machine.
Fig. 26 is a cross-sectional view taken on line 26—26 of Fig. 4.
Fig. 27 is a cross-sectional view taken on line 27—27 of Fig. 4.
Fig. 29 is a view similar to Fig. 28, but showing the cut-off ram in its "down" position.
Fig. 30 is a cross-sectional view taken on line 30—30 of Fig. 29.

The guide 182 extends horizontally forwardly of the box 25 for a distance and then curves downwardly as at 189 (Figs. 1 and 2). Extending from the downwardly and forwardly curved portion 189 is a downwardly and forwardly inclined portion 190. The portion 190 of the guide, however, is provided with a top wall 191 which extends upwardly above the horizontal portion of the guide as at 192. At the upper end of said guide portion 192 is a rearwardly and upwardly inclined portion 193 for the purpose hereinafter appearing. Thus the guide portion 190 is closed at the top. At the lower end of the guide portion 190 is a forwardly and downwardly curved portion 194 from which extends a horizontal guide portion 195 resting on top of the top wall 12 of the base. At the forward end of the guide portion 195 is an upwardly and forwardly curved guide portion 196 from which extends upwardly a vertical guide portion 197 (Fig. 26). The guide portion 197 terminates as at 198.

The operation of the wire-forming mechanism in shaping the wire W into zig-zag shape will now be described, by reference to Figs. 34 to 38. Beginning with Fig. 34, the wire W is shown passing from the guide 135 and already formed with sinuous loops. The following description will explain how additional loops are made as the machine continues to operate.

In Fig. 34 the levers 171 are shown in symmetrical positions. The box cams 165 both rotate in the same (counterclockwise) direction. The cam grooves 166 are in such position that their major diameters are parallel to one another and to the wire W passing through groove 136. The followers 174 on the levers 171 are at the outer sides of the semi-circular groove portions 167. The pins 103, 104 are on a transverse diameter of the turret 101. The reciprocating pin 128 is down in the position shown in Fig. 8. The wire W as shown in Fig. 34 passes centrally between the pins 103, 104, then turns sharply to the left as at 200, and extending from the curved portion 200 is an offset arm 201 of the last formed loop 202, contacting pin 103. (It is assumed that the last formed loop 202 and the loops in advance thereof have already been formed.) The pins 179 on the levers 171 are away from the wire in this position. The spring 163 in such position, furthermore, centers the wire W.

Beginning now with the position of Fig. 34, let us consider that the turret 101 is rotated in a clockwise direction through an angle of 90° from the position of Fig. 34 to the position of Fig. 35. During such operation, the box cams 165 move in a counterclockwise direction through an angle of 45° from the position shown in Fig. 34. This is so since the box cams rotate one-half the angle of rotation of the turret. (One complete revolution of the box cams will occur during a 360° revolution of the turret 101, first in one direction and then 360° in an opposite direction.)

During the movement of the turret 101 from the position shown in Fig. 34 to the position shown in Fig. 35, the pin 128 will move upwardly from its "down" position to its "up" position. This is true since 90° rotation of the turret is accompanied by 45° rotation of the cam disc 117, bringing one of the bumps 118 beneath the roller 126 to raise the pin 128. As the turret 101 moves from the position shown in Fig. 34 to the position shown in Fig. 35, pin 103 which contacts arm 201, will move the wire W forwardly to push some of the formed loops into the guide 182. The pin 103 then engages the curved portion 200 of the wire and pushes it against the raised stop pin 128. The pin 104 engages the wire W further rearwardly as at 203 to begin forming an arm 204 between portions 200, 203. The stop pin 128 holds the wire W from moving forwardly at this time.

It will also be observed that during the movement of the parts from the position of Fig. 34 to the position of Fig. 35, the left lever 171 is not rotated since its follower 174 remains within the semi-circular cam portion 167 of its cam which is concentric with the axis of the cam. During such operation, however, the right lever 171, looking at Fig. 34, begins to rotate in a counterclockwise direction since its follower 174 moves in one of the cam portions 168 of its cam. The movement of the right cam 165 is not sufficient to bring its pin 179 into contact with the wire. However, as the parts move from the position of Fig. 35 to the position of Fig. 36, pin 179 of the right lever 171 contacts the wire between the curved portion 200 and arm 201. During this time the left lever 171 still does not move as its follower is still within the cam groove portion 167. As the turret rotates through an angle of 45° from the position of Fig. 35 to that of Fig. 36, the wire is bent so that the portion 203 thereof becomes a bend around pin 104 and the portion 200 is further bent around pin 103. Between the portions 203 and 200 is formed the arm 204 similar to the arm 201. A loop is thus being formed comprising the portions 201, 200, 204, and this U-shaped loop begins to close up. As the parts move from the position of Fig. 36 to the position of Fig. 37, the lever 171 continues to rotate in a counterclockwise direction, and the turret continues to rotate in a clockwise direction through another angle of 45°. During this period, the left lever 171 still does not move. However, the pin 179 of the right lever 171 presses against the arm 201, and the pin 104 pressing against the portion 203 serves to close the loop 201, 200, 204 and said loop is substantially closed around the pin 103.

Fig. 37 illustrates the most inward position of the right lever 171. The wire W is moved to the left when the machine moves from the position of Fig. 34 to the position of Fig. 37, tensioning the spring 163. At this point the turret begins to rotate in an opposite direction and Fig. 38 shows the position when it is turned back through an angle of 180°. During such period the right lever 171 has begun to swing in a clockwise direction away from the wire. The pin 103 has advanced the wire and moved out of the loop 201, 200, 204, and the pin 104 is moved into engagement with the newly formed arm 204, and wire W has moved to the right under the influence of spring 163. In the position shown in Fig. 36, the pin 128 is still up, but beginning to come down. In the position shown in Fig. 37, it has already come down. In the position shown in Fig. 38, it is down.

As the machine continues to operate, a next loop is formed opposite to the loop just formed and this new loop will be formed by the left lever 171 while the right lever 171 remains out of operation. The next loop is formed by rotation of the turret 101 through an angle of 180° from the position of Fig. 38, first in a counterclockwise direction and then 180° in a clockwise direction, and then the parts will be back to the position of Fig. 34. During such movement the left lever 171 is moved first in a clockwise direction and then in a counterclockwise direction, in a manner symmetrical to the movement of the right lever 171. It will now be understood that as the machine continues to operate, the left and right loops are alternately formed to produce a continuous zig-zag shaped wire which is fed into the guide 182.

It will now be understood that the stop member 128 is restricted to reciprocation parallel to the axis of the turret, from an inoperative position away from the bending plane of the wire above the turret to an operative position in said plane.

It will be observed that the positions of the pins 179 may be adjusted by loosening the nuts 178, rotating the screws 177 to desired positions and then again tightening said nuts.

Figures 5, 26, 31, 32, 33:
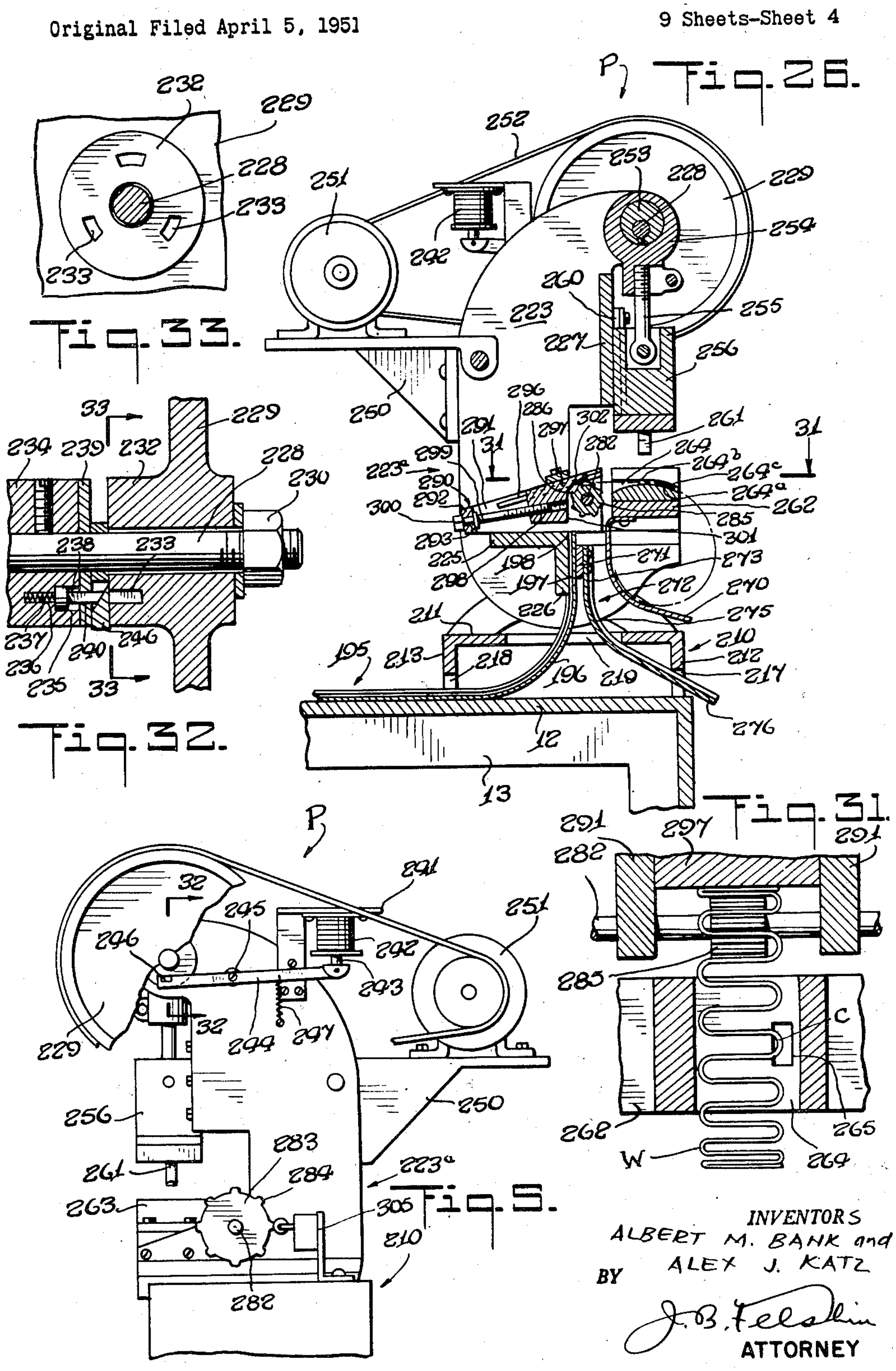
Fig. 5 is a side elevational view of the cut-off end of the machine, with parts broken away.
Fig. 31 is a cross-sectional view taken on line 31—31 of Fig. 26.
Fig. 32 is a cross-sectional view taken on line 32—32 of Fig. 5.
Fig. 33 is a cross-sectional view taken on line 33—33 of Fig. 32.

Referring to Figs. 26, 30 and 31, means is provided to longitudinally arch the zig-zag shaped wire and cut off predetermined lengths of said wire, in synchronization with the operation of the zig-zag forming mechanism. To this end, there is provided a punch press P on the top wall 12 of the base 11, at its forward end. The same comprises a stand 210, fixed to base 11 and having a top wall 211, a front wall 212, rear wall 213, and side walls 214. Extending outwardly from the side walls 214 are flanges 215 receiving attaching bolts 216 which attach said stand to the top of the base adjacent its front end.

The front wall 212 is formed at its lower end with a through opening 217. The rear wall 213 is formed with a through opening 218. The top wall 211 is formed with a central opening 219. It will be noted that the guide portion 195 (Fig. 26) passes through the opening 218 and that the guide portion 196 passes upwardly through the opening 219.

Fixed to the top of the top wall 211 are a pair of similar symmetrical brackets 220, each formed with a pair of similar symmetrically disposed arcuate slots 221. Also carried by the brackets 200 are aligned pivot pins 222. Supported on the pivot pins 222 are a pair of parallel upstanding side walls 223 forming part of a power press frame 223*a*. At the lower ends of the walls 223 are bolts 224 passing through the slots 221. The side walls 223 are interconnected by a horizontal bar 225 from the front end of which extends downwardly, a vertical bar 226. It will be noted that portion 197 of the guide contacts the front surface of the vertical bar 226 and that the upper end 198 of said guide is flush with the top surface of the horizontal bar 225.

Said side walls 223 are also interconnected by a vertical upper bar 227. At the upper ends of the walls 223 are a pair of spaced aligned bearings 227*a* in which is journaled for rotation a transverse shaft 228, carrying at one end a fly wheel 229 freely rotating on said shaft. Screwed to said end of the shaft is a nut 230 to retain the fly wheel thereon. On the opposite end of the shaft is a collar 231 contacting one of the bearings 227*a*. The wheel 229 is formed at its inner side with a hub 232 provided with a plurality of equiangularly spaced longitudinal sockets 233. Fixed to the shaft 228 and disposed between one of the bearings 227*a* and the fly wheel 229 is a clutch member 234 (Figs. 4 and 32). The clutch 234 is formed at one side thereof with a socket 235 and extending therefrom is a reduced socket portion 236. Within the reduced socket portion 236 is a coil compression spring 237. Slidably mounted in the socket 235 is a clutch pin 238 which is normally pressed to the right as shown in Fig. 32, toward one of the sockets 233. Attached to one end of the clutch 234 is a plate 239 formed with an opening 240 registering with the clutch pin 238.

It will now be understood that when the clutch pin 238 is pressed into the socket 233, rotation of the fly wheel 229 will be accompanied by rotation of the clutch 234 and the shaft 228.

Referring to Figs. 4, 5 and 32, means is provided to declutch the fly wheel 229 from the shaft 228. To this end, there is mounted on one of the side walls 223, a bracket 241 carrying a solenoid 242 provided with an armature 243 pivoted at its lower end to a lever 244. The lever 244 is pivoted to the frame 223*a* as at 245. At the forward end of the lever is a wedge 246 movable up and down between the hub 232 and the clutch. When the solenoid 242 is energized, the lever 244 is rotated in a counterclockwise direction, looking at Fig. 5, to move the wedge 246 downwardly to permit spring 237 to press the clutch pin 238 into one of the sockets 233, for rotating the shaft 228 through the fly wheel 229. When the solenoid 242 is de-energized, lever 244 is rotated in a clockwise direction under the influence of a coil tension spring 247 which interconnects the rear end of the lever with the frame 223*a* to move the wedge 246 upwardly for disengaging the clutch.

It will be noted that the clutch pin 238 has a wedge shaped end adapted to be engaged by the corresponding wedged surface of the wedge portion 246 when the latter moves upwardly. Means is provided to rotate the wheel 229. To this end there is mounted on the frame 223a, a bracket 250 on which is mounted an electric motor 251 belted as by belt 252 to the wheel 229.

Mounted on the portion of the shaft 228 between bearings 227a is an eccentric collar 253 fixed to said shaft and rotatable therewith. Mounted on the collar 253 is a connector sleeve 254 formed with a through opening receiving the eccentric collar 253. Attached to the sleeve 254 is a connector rod 255, attached at its lower end to a ram 256. The ram 256 is guided in its sliding movement by a pair of guide plates 257 screwed to forwardly-extending portions of said bar 227 by means of screws or bolts 259. The ram 256 has wings received in slots 260 disposed between the plates 257 and said bar 227. Attached to the lower end of the ram 256, in any suitable manner, is a cutter punch 261.

It will now be understood that when the motor 251 is energized, the fly wheel 229 will continuously rotate and when the clutch 234 is clutched to the fly wheel 229, the shaft 228 will rotate, causing rotation of the eccentric collar 253 and hence causing reciprocation of the ram 256 and the punch tool or cutter 261.

Supported on the front of the frame 223 is a horizontal transverse bar 262 (Figs. 28, 29 and 30). Mounted on the cross bar 262 is a platen 263 to the top of which is attached a block 263a. The members 262, 263a together form a female punch press portion. The latter is formed with a downwardly-extending through opening 265, from the lower end of which extends rearwardly and downwardly a passage 266 for punched pieces of metal, as will be explained hereinafter. The opening 265 is aligned with the cutter 261 and when the ram comes down, said cutter is adapted to descend into the opening 265 for cutting a curved end C of zig-zag shaped wire, as will more fully be explained hereinafter.

The block 263, 263a is formed with a passage 264 having a bottom curved or arched surface 264a, as shown in Figs. 26 and 30, and a top rear horizontal surface 264b from which extends a forward and downwardly curved surface 264c forming a continuation of the surface 264a. Thus the passage 264 has a wider mouth gradually decreasing into a curved narrow passage. It will be noted that the passage 265 crosses the passage 264, as shown in Figs. 28, 29, 30 and 31.

Attached to the underside of the bar 262 is the upper end 267 of a guide plate 268. Said guide plate 268 comprises a portion 269 extending downwardly from the portion 267 thereof and extending from said portion 269, is a downwardly and forwardly curved portion 270.

Interconnecting the side walls 223 is also a cross bar 271 contacting the front side of the guide portion 197 below the upper end 198 thereof. Attached to the front of the cross bar 271 is the upper end of a guide or chute 272. Said guide 272 comprises an upper portion 273 and extending downwardly therefrom is a forwardly curved portion 275 from which extends a downwardly and forwardly inclined portion 276. The curved portion 275 passes downwardly through the opening 219 and the inclined portion 276 passes downwardly and forwardly through the opening 217 of said stand 210.

Mounted on the cross bar 225 are a pair of aligned bearings 280 and 281 in which is journaled a transverse shaft 282. On one end of said shaft is mounted a wheel 283 formed with a plurality of equiangularly spaced projections 284. For the purpose of illustration, 8 such projections are shown on said wheel (Fig. 39). On the central portion of the shaft is a ratchet wheel 285 provided with 8 equiangularly spaced ratchet teeth 286. There are the same number of teeth on ratchet wheel 285 as there are projections 284 on wheel 283. The wheel 285 is also fixed to the shaft 282 and it is in angular registry with the wheel 283.

Mounted on the cross bar 225 is a bracket 290 comprising side walls 291 interconnected at the rear by a cross bar 292 formed with a central through opening 293. The shaft 282 passes through openings in the side walls 291 of the bracket. Said side walls 291 are formed with upwardly and forwardly inclined slots 296 in which is slidably mounted a block 297, formed with a screw-threaded opening 298. Screwed into the opening is a screw 299 rotatably and non-slidably connected to the cross bar 292 and passing through the opening 293. At the rear end of the screw 299 is a polygonal head 300.

It will now be understood that upon turning the head 300 with a wrench or other tool, the screw 299 will turn for moving the block 297, either forwardly and upwardly toward the ratchet wheel 285, or downwardly and rearwardly away from said wheel. Said block 297 is hence adjustable. It has at its front end a lower vertical surface 301 which is aligned with one side of the upper end of the passage in the guide portion 197, so that as the zig-zag shaped wire moves through the guide 195 up through the portion 196 and the portion 197, it will come up and contact said surface 301. Extending from the surface 301 is an upwardly and forwardly curved surface 302 spaced from the wheel 285. The arrangement is such that as the wheel 285 turns, it will engage successive arms of the zig-zag shaped wire and move the wire around said surface 302, and into the mouth of passage 264, pressing it through said passage. The opening 265 is so located that the outer curved ends of the bends of the zig-zag shaped wire on one side, will pass over said opening, as illustrated in Figs. 28, 29 and 31. Thus, when the cutter 261 comes down in the passage 265, it will cut off a piece of curved end of the zig-zag wire, leaving two straight arm portions. The pieces of wire which are cut off fall down through the opening 265 and passage 266 and down through the passage 303 and onto chute 272. They may then be dropped into any suitable receptacle as they fall down the inclined guide portion 276 of said chute. The zig-zag shaped wire emerging from the passage 264 will be curved and will come down as shown in dot-dash lines in Fig. 26 and engage the top surface of guide member 268, moving up the guide portion 270 toward the guide portion 269. The severed pieces may be removed manually or in any other suitable manner. Curved surface 302 serves to curve the zig-zag shaped spring longitudinally.

Mounted on the stand 210 is a normally open micro-switch 305 adapted to be closed each time one of the projections 284 on the wheel 283 passes said micro-switch. The purpose of the micro-switch will be explained hereinafter.

Referring now to Figs. 7 and 8, there is journaled in the bushings 33 and 36 a horizontal transverse shaft 306 projecting beyond opposite sides of the box 25. Fixed on said shaft is a worm wheel 307 meshing with the worm 116. On one end of the shaft 306 is a gear 308. Also fixed to said end of said shaft is a sprocket wheel 309. On the side wall 27 adjacent which the sprocket wheel 309 is located is a horizontal guide 310. Slidable in said guide is a plate 311 formed with a screw threaded opening into which is screwed a horizontally extending hand screw 312. On the shank of the screw 312 is a bushing 313 and rotatably mounted on the bushing is a sprocket wheel 314 aligned with the sprocket wheel 309. Extending around the sprocket wheels 309, 314 is a sprocket chain 315.

It will now be understood that the screw 312 may be adjusted longitudinally of the guide 310 and then tightened in place by turning the screw. Attached to the sprocket belt 315 is a lug or projection 316. At the opposite end of shaft 306 is fixed a sprocket wheel 317 for the purpose hereinafter appearing.

Fixed to the top wall 12 of the base are a plurality of ball bearing pillow blocks 320 (Figs. 3 and 19) supporting a transverse horizontal shaft 321. Fixed to one end of the shaft is a gear 322 meshing with the gear 308. Attached to the pillow blocks 320 are horizontally aligned bushings 323 (Figs. 3 and 20) supporting a transverse horizontal shaft 324. Attached to the shaft 324 is a bracket 325 provided with a screw 326 contacting the forward end of the box 25 to adjustably limit rotary movement of the shaft in a clockwise direction, looking at Fig. 22. Fixed to said shaft 324 is a pin 327 connected by a coil tension spring 328 to the forward end of the box 25 for rotating the shaft 324 in a clockwise direction until the adjustable screws 326 contacts said box. Fixed to one end of the shaft 324 is an arm 329 provided with a roller 330 at its outer end. The roller 330 is normally in the path of the lug 316. As the belt 315 moves, the lug 316 will strike the underside of the roller 330 to raise the arm 329 and rotate the shaft 324 against the tension of the spring 328 in a counterclockwise direction, looking at Fig. 2 of the drawing. When the lug 316 bypasses the roller 330 said spring 328 will rotate the shaft in a clockwise direction until the screw 326 strikes box 25.

Fixed to the shaft 324 is an arm 331 having a hook 332 at its outer end. Obviously when the shaft 324 rotates the arm 331 will rotate therewith.

Figures 19, 20, 23, 24, 25:
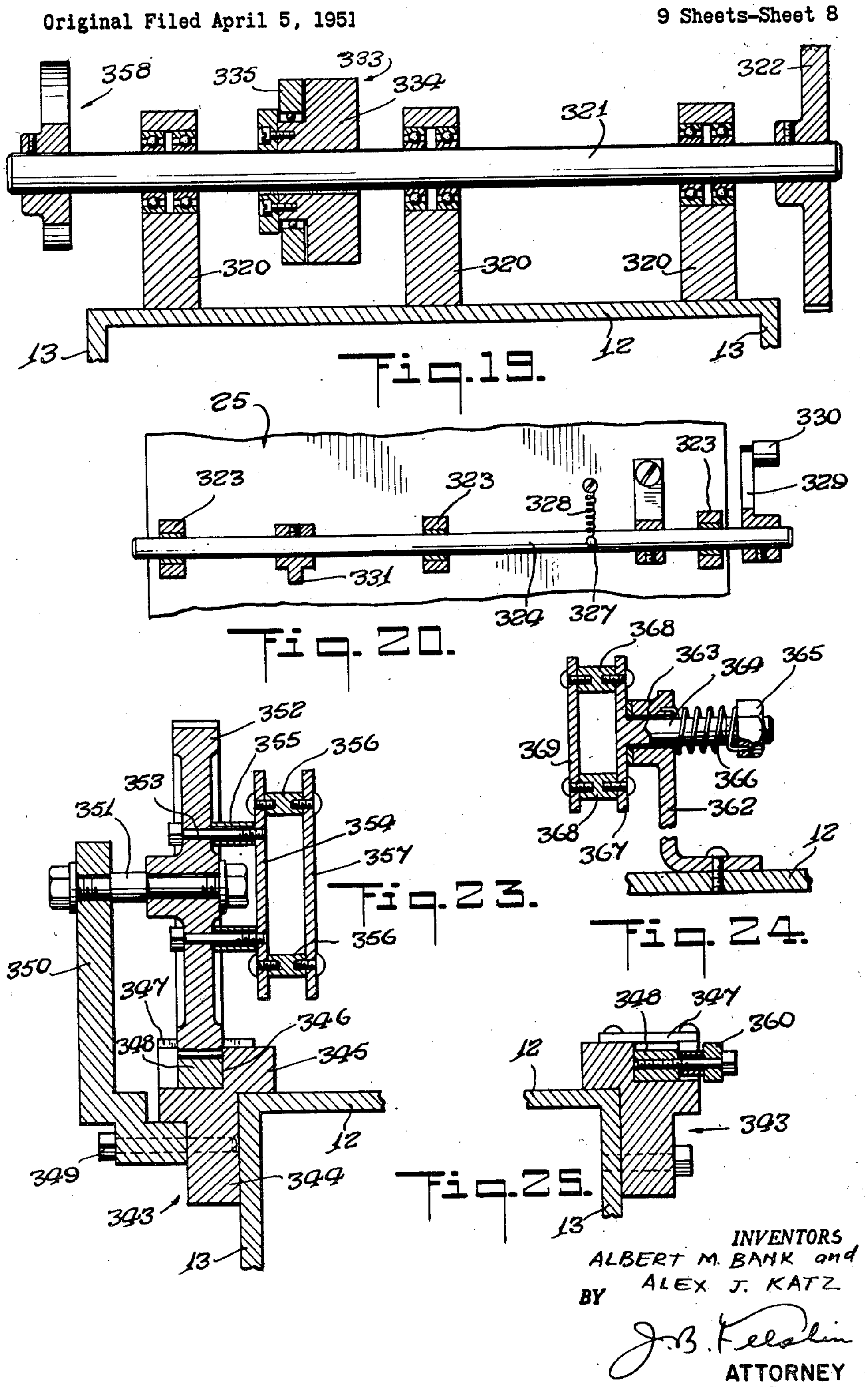
Fig. 19 is a cross-sectional view taken on line 19—19 of Fig. 1.
Fig. 20 is a cross-sectional view taken on line 20—20 of Fig. 1.
Fig. 23 is a cross-sectional view taken on line 23—23 of Fig. 1.
Fig. 24 is a cross-sectional view taken on line 24—24 of Fig. 1.
Fig. 25 is a cross-sectional view taken on line 25—25 of Fig. 1.

Mounted on the shaft 321 is a one revolution clutch 333 (Figs. 3, 19 and 21). The clutch may be of usual construction. It comprises a part 334 fixed to the shaft 321 and a ring 335 mounted thereon for rotation with spring pressed clutch balls therebetween. On the ring 335 is an outwardly projecting pin 336. Also said ring 335 is formed in its outer surface with a shoulder 337 adapted to be engaged by the hook 332. Normally, when the hook 332 engages the ring 335 as shown in Fig. 21 of the drawing, said ring will not rotate, while the shaft and member 334 rotate. However, should the shaft 324 be rotated in a clockwise direction, looking at Fig. 21, to disengage the hook from the shoulder 337, the clutch balls will cause ring 335 to rotate. Before the ring 335 makes a complete revolution, the arm 331 is again rotated toward the outer periphery of the ring and when the shoulder 337 again comes to the hook 332, rotation of said ring 335 ceases. Thus the ring has been rotated through one revolution.

Fixed to the top of the table 12 is a normally open micro-switch 337*a* which is contacted by the pin 336 once during each revolution of the ring 335 and hence once each time the lug 316 on the belt 315 contacts the roller 330. The switch 337*a* is closed when it is actuated by the pin 336.

Referring now to the wiring diagram shown in Fig. 39, the switch 337*a* is connected to the solenoid 242, which in turn is connected to one side of the power supply. Said switch 337*a* is also connected through the switch 305 to the other side of the power supply. When the switches 337*a* and 305 are closed, the solenoid 242 is energized to operate the ram for cutting the zig-zag shaped wire. Interposed between the switch 337*a* and the solenoid 242 is a normally closed micro-switch 338, mounted on the guide member 182 adjacent the underside of the guide portion 193, as shown in Fig. 2 of the drawing. The switch 338 includes an arm 339 which is located beneath the upper end of the guide portion 193. Should the zig-zag forming mechanism continue to operate without the zig-zag shaped wire feeding out from the cutting end of the machine, said zig-zag shaped wire will pile up or raise upwardly from guide 182 beneath the guide portions 192, 193. This is so because the guide portions 182 and 189 are open at the top. If the zig-zag shaped wire rises to the point shown in dotted lines in Fig. 2, it will engage the arm 339 of the switch 338 and open said switch, thereby breaking the circuit to the solenoid 242 to prevent the cutting mechanism from operating.

It will be noted that the cutting of the zig zag shaped wire is indexed with the feeding of the zig zag shaped wire through the passage 264, to make sure that when the cutter comes down it will cut off one of the curved loop ends C as indicated in Fig. 31. This is true since the wheel 283 rotates together with the ratchet wheel 285, which feeds the zig zag shaped wire through the passage 264 and further, because one of the projections 284 of said wheel 283 must close the switch 305 at the time switch 337*a* closes, in order to energize the solenoid 242. The lugs 284 contact the switch 305 in synchronization with the passage of the curved loop ends C past the middle of the opening 265.

Means is provided to halt the rotation of shaft 282 and hence the feeding of the zig zag shaped wire past the cut-off station during the cutting off operation. To this end there is attached to one side of the base, an upright bracket 340 (Figs. 1 and 7) formed with an opening in which one outer end of the shaft 306 is journaled. The bracket extends upwardly above the box 25 and mounted on the upper end thereof, for rotation, is a sprocket wheel 342 disposed in the same vertical plane as sprocket wheel 317.

Also fixed to the same side wall 13 of the base to which the bracket 340 is attached, is a guide bracket 343 (Figs. 1, 23, and 25) extending longitudinally of the base. Said bracket 343 has a flange 344 contacting the outer surface of wall 13. It is also formed with a flange 345 resting on top of the wall 12, and it is furthermore formed with a longitudinal groove 346 open at the top. Attached to the top of the bracket are plates 347 overlying end portions of the groove 346. Slidably mounted within the groove is a longitudinal rack 348, the teeth of which project upwardly. Attached to the bracket flange 344, as by bolts 349, is an upstanding bracket 350 supporting a horizontal shaft 351, on which is rotatably mounted a gear 352 meshing with the rack 348. Extending through the gear 352 is a circular row of bolts 353 screwed to a circular disc 354. Sleeve spacers 355 on the bolts 353 space the disc 354 from the gear 352. Attached to the disc 354 are a pair of diametrically spaced pins 356, equally spaced from the center of the disc. Attached to said pins is a second disc 357 similar to the disc 354. Said discs 354, 357 are coaxial with the gear 352 and rotate therewith.

Rotatably mounted on the outer end of shaft 321 is a crank fly wheel 358. The crank fly wheel 358 has a weighted segmental portion at one end and a crank arm at the other end. Said crank arm is interconnected to the rack 348 by a connector link 360. Both the crank and the rack carry suitable pivot pins to which the outer ends of the link 360 are pivotally connected.

Fixed on one end of the shaft 282 is a sprocket wheel 361 in the same vertical plane as the sprocket wheels 342, 317.

Attached to the top wall 12 and extending upwardly therefrom is a bracket 362 (Figs. 1 and 24) formed at its upper end with a horizontal bearing opening 363. Extending through said opening 363 is a shaft 364. Fixed to the outer end of the shaft is a nut or collar 365. Interconnecting the nut or collar 365 with the upper end of the bracket 362 and surrounding the shaft 364 is a coil tension spring 366, which tends to rotate the shaft 364 in a clockwise direction as viewed in Fig. 1. At one end of the shaft 364 is a circular disc 367, coaxial with said shaft. Attached to said disc 367 are a pair of diametrically opposed pins 368, and fixed to said pins is a second disc 369 similar and parallel to and coaxial with the disc 367. The pins 368 and the pins 356 are likewise located in the plane of the sprocket wheels 317, 342, and 361.

Engaged with the sprocket wheels 317, 342 and 361 is a sprocket chain 370. The sprocket chain passes around the sprocket wheel 317, then passes upwardly and over the sprocket wheel 342, then passes forwardly and around the top pin 368 and then between said pins 368 and then underneath the lower pin 368. It then extends forwardly and over and around the sprocket wheel 361. It then extends downwardly and rearwardly around the lower pin 356 and then upwardly and between said pins 356, and then around the upper pin 356. It then passes downwardly and rearwardly to and around the sprocket wheel 317.

It will now be understood that the shaft 321 rotates continuously and hence the crank fly wheel 358 rotates continuously. Rotation of the crank 358 is accompanied by reciprocation of the rack 348 which causes oscillation of the gear 352.

Power is imparted to the belt 370 from the continuously driven sprocket wheel 317. In the position of the weighted crank member 358 shown in Fig. 1, the rack 348 is at the right end of the stroke, and in such position the sprocket chain 370 is slack and clockwise rotation (see Fig. 1) thereafter of the sprocket wheel 317 will merely serve to take up slack in the sprocket chain without turning the sprocket wheel 361. As gear 317 takes up slack in the portion of the chain 370 controlled by gear 352, such slack imparted to the top run of the chain is taken taken up by wheel 369 under the influence of torsion spring 366. Wheel 369 rotates in a clockwise direction (Fig. 1) to take up slack in chain 370. It is clear that the zig zag shaped wire is only advanced past the cutting station when the wheel 361 is moving to rotate the shaft 282. When the sprocket chain 370 is slack, therefore, wheel 361 will not turn, the shaft 282 will not rotate, and the zig zag shaped wire will not move past the cutting station. It is in such position that the ram comes down to cut the wire. However, when the crank 358 rotates through an angle of about 180° and the rack 348 has been moved to the left, looking at Fig. 1, gear 352 will be rotated in a clockwise direction, looking at said figure, to take up slack and tighten the belt 370. As the belt 370 is tightened the shaft 364 is rotated in a counterclockwise direction, looking at Fig. 1, to tension the torsion spring 366. In taut condition the belt 370 will drive the wheel 361 for advancing the zig zag shaped wire past the cutting station.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense except as required by the claims.

Having thus described our invention in some detail what we claim as new and desire to protect by Letters Patent of the United States, is:

1. In combination, means to shape wire, a shaft mounted for rotation, means interconnecting said shaft to said first means to cause said shaft to rotate continuously when the first means is operated, a one revolution clutch on said shaft, means controlled by said first means to periodically actuate said one revolution clutch, means for cutting the wire shaped by said first means, means to control said cutting means, including a solenoid, a circuit for said solenoid, a switch in said circuit, means controlled by said one revolution clutch to actuate said switch, means to feed the shaped wire to the cutting means, drive means to connect said first means with said feeding means, and means controlled by said clutch to render said drive means inoperative when said switch is actuated, a second switch in said circuit, means controlled by the feeding means to close said second switch only when the feeding means is in certain predetermined positions relative to the cutting means, means controlled by concurrent closure of both switches to close the circuit for the solenoid, means controlled by the energization of the solenoid to activate said cutting means, whereby to index the cutting of the shaped wire and to halt the operation of the feeding means during operation of the cutting means.

2. In combination, means to shape wire, a shaft mounted for rotation, means interconnecting said shaft to said first means to cause said shaft to rotate continuously when the first means is operated, a one revolution clutch on said shaft, means controlled by said first means to periodically actuate said one revolution clutch, means for cutting the wire shaped by said first means, means to control said cutting means, including a solenoid, a circuit for said solenoid, a switch in said circuit, means controlled by said one revolution clutch to actuate said switch, means to feed the shaped wire to the cutting means, including guide means to guide the shaped wire from the shaping means to the feeding means, drive means to connect said first means with said feeding means, and means controlled by said clutch to render said drive means inoperative when said switch is actuated, a second switch in said circuit, means controlled by the feeding means to close said second switch only when the feeding means is in certain predetermined positions relative to the cutting means, means controlled by concurrent closure of both switches to close the circuit of the solenoid means, means controlled by energization of the solenoid to actuate said cutting means whereby to index the cutting of the shaped wire, and halt the operation of the feeding means during the operation of the cutting means and a third switch in said circuit disposed adjacent the shaped wire guided by said guide means from the shaping means to the feeding means and adapted to be engaged thereby should the shaped wire stop feeding for more than a predetermined time while the shaping means continues to operate and move out of said guide means.

3. In combination, mechanism for shaping wire into zig-zag form comprising transverse arm portions interconnected by end curved portions, a shaft, means to rotate said shaft in synchronization with said mechanism, a sprocket wheel fixed on said shaft, a second shaft parallel to the first shaft, a second sprocket wheel on the second shaft, a sprocket chain over said first and second sprocket wheels, a third sprocket wheel fixed on the first shaft, a third shaft, means to rotate the third shaft from the first shaft, a crank on the third shaft, a rack, guide means for said rack to permit longitudinal reciprocation of said rack, a connector link pivoted to the crank and pivoted to the rack whereby rotation of the crank will reciprocate said rack, a gear mounted for rotation and meshing with said rack whereby to oscillate said gear as said rack is reciprocated, a fourth shaft mounted for rotation, a fourth sprocket wheel fixed on said fourth shaft and aligned with the third sprocket wheel, a pair of pins on said gear, at oposite sides of the axis thereof, a second sprocket chain engaging said third and fourth sprocket wheels and passing between the pins on said gear whereby said second sprocket chain is driven by said first shaft and drives said wheel when said gear is rotated in one direction to tighten said second sprocket chain, a wheel fixed on said fourth shaft formed with teeth to engage the arms of the shaped wire for advancing the same, means for guiding the shaped wire from said shaping mechanism to said teeth, a cutter for cutting the shaped wire, a solenoid for operating said cutter, a circuit for said solenoid, including a switch, means including a member on said first sprocket chain for controlling the operation of said switch, a second switch in said circuit in series with the first switch, a second wheel on said fourth shaft formed with teeth aligned with the projections on the first wheel of said fourth shaft, said projections of said second wheel controlling said second switch whereby said solenoid is actuated when both said first and second switches are simultaneously actuated.

4. The combination of claim 3, in combination with a rotary disc, a pair of pins on said rotary disc, said second sprocket chain passing between the pins on said rotary disc, and spring means to urge rotation of the rotary disc in a direction to take up slack in said second sprocket chain.

5. In combination, mechanism for shaping wire into zig-zag form comprising transverse arm portions interconnected by end curved portions, a first shaft, means to rotate said shaft in synchronization with said mechanism, a sprocket wheel fixed on said first shaft, a second shaft, means to rotate the second shaft from the first shaft, a crank on said second shaft, a rack, guide means on the rack to permit longitudinal reciprocation of said rack, a link eccentrically pivoted to the crank and pivoted to the rack whereby rotation of the crank will reciprocate said rack, a gear mounted for rotation and meshing with said rack, whereby to oscillate said gear as said rack is reciprocated, a third shaft mounted for rotation, a second sprocket wheel fixed on said third shaft aligned with the first sprocket wheel, a pair of pins on said gear at opposite sides of the axis thereof, a sprocket chain engaging said sprocket wheels and passing between said pins on said gear whereby said sprocket chain is driven by said first sprocket wheel and drives said second sprocket wheel when said gear is rotated in one direction to tighten said sprocket chain, a wheel on said third shaft formed with teeth to engage the transverse arms of the wire shaped by said mechanism, for advancing the same, means for guiding the shaped wire from said mechanism to said projections, a cutter for cutting the shaped wire, a solenoid for controlling the operation of said cutter, a circuit for said solenoid, including a switch, means controlled by the movement of the first shaft for actuating said switch each time said shaft moves through a predetermined angle, a second switch in said circuit in series with said first switch, a second wheel on said third shaft formed with projections aligned with the teeth on the first wheel of said third shaft, said projections of said second wheel actuating said second switch whereby said solenoid is actuated only when both said first and second switches are simultaneously actuated, for indexing the cutting of the shaped wire in predetermined lengths.

6. The combination of claim 5, in combination with a rotary disc, a pair of pins on said rotary disc, said sprocket chain passing between the pins on said rotary disc, and spring means to urge rotation of the rotary disc in a direction to take up slack in said sprocket chain.

7. In combination, mechanism for shaping wire into zig-zag form comprising transverse arm portions interconnected by end curved portions, a first shaft, means to rotate said shaft in synchronization with said mechanism, a second shaft, a feed wheel on said second shaft provided with teeth, means to guide the shaped wire from said mechanism to said teeth, whereby rotation of said wheel will feed said wire, said teeth being engageable with the transverse arm portions of the shaped wire, means controlled by the first shaft to drive second shaft, means controlled by the first shaft to periodically interrupt the drive of the second shaft, a switch, means controlled by said interrupting means for actuating said switch when the drive of the second shaft is interrupted, a second wheel on said second shaft formed with projections aligned with the teeth of the first wheel, a second switch, said projections of the second wheel actuating said second switch, a solenoid in series circuit with said first and second switches whereby said solenoid is actuated only when both switches are concurrently actuated, and a cutter for the shaped wire controlled by said solenoid whereby said cutter is actuated only when the drive of the feeding wheel is interrupted and both switches are concurrently actuated.

8. The combination of claim 7, in combination with a third switch in series circuit with the first two switches and located adjacent said guide means and adapted to be opened by the shaped wire leaving said guide means should the shaped wire stop feeding for more than a predetermined time while the shaping means continues to operate.

9. In combination, means to shape wire, a shaft mounted for rotation, means interconnecting said shaft to said first means to cause said shaft to rotate continuously when said shaping means is operated, a sprocket wheel on said shaft, a second shaft, a second sprocket wheel on the second shaft, a slack sprocket chain interconnecting said sprocket wheels, means on said second shaft to feed wire from said shaping means, means controlled by the first shaft to periodically tighten the slack in the sprocket chain for alternately driving the second shaft and interrupting the drive, a switch, means controlled by said last means for actuating said switch each time the chain is slack and the drive is interrupted, a solenoid, cutting means for the wire controlled by said solenoid, a second switch in series circuit with said first switch and solenoid, means controlled by the feeding means to close the second switch only when the feeding means is in predetermined positions relative to said cutting means, and means controlled by the concurrent closure of both switches to energize the solenoid for actuating the cutting means.

10. The combination of claim 9, in combination with spring means to take up slack in said sprocket chain.

11. The combination of claim 9 in combination with a third switch in said circuit, means to guide the shaped wire from the shaping means to the feeding means, said third switch being located adjacent the guide means and being adapted to be actuated by shaped wire moving out of the guide means should the shaped wire stop feeding for more than a predetermined time while the shaping means continues to operate.

References Cited in the file of this patent

UNITED STATES PATENTS

| | | |
|---|---|---|
| Re. 23,169 | Horton | Nov. 22, 1949 |
| 882,385 | Harter | Mar. 17, 1908 |
| 890,907 | Horsley | June 16, 1908 |
| 1,801,043 | Harber | Apr. 14, 1931 |
| 2,030,988 | Hofstetter | Feb. 18, 1936 |
| 2,212,348 | Ludington | Aug. 20, 1940 |
| 2,260,053 | Platt | Oct. 21, 1941 |
| 2,277,458 | Schultze | Mar. 24, 1942 |
| 2,307,046 | Johnson | Jan. 5, 1943 |
| 2,390,283 | Wilkins | Dec. 4, 1945 |
| 2,410,298 | Mirel | Oct. 29, 1946 |
| 2,464,635 | Cunningham | Mar. 15, 1949 |
| 2,609,085 | Terhune | Sept. 2, 1952 |
| 2,645,252 | Norman | July 14, 1953 |